United States Patent [19]

Weisweiler et al.

[11] Patent Number: 4,986,744

[45] Date of Patent: Jan. 22, 1991

[54] APPARATUS FOR MANUFACTURING MULTI-LAYERED CONCRETE ROOF TILES

[75] Inventors: Manfred Weisweiler, Dreieichenhain; Günter Jöst, Rodgau, both of Fed. Rep. of Germany

[73] Assignee: Braas GmbH, Fed. Rep. of Germany

[21] Appl. No.: 253,533

[22] Filed: Oct. 5, 1988

[30] Foreign Application Priority Data

Mar. 18, 1988 [DE] Fed. Rep. of Germany ....... 3809162

[51] Int. Cl.[5] ....................... B28B 11/08; B20B 19/00; B29C 47/06

[52] U.S. Cl. ........................................ 425/94; 425/99; 425/104; 425/132; 425/133.5; 425/134; 425/461

[58] Field of Search .................. 425/130, 131.1, 133.5, 425/134, 132, 81.1, 364 R, 90, 94, 98, 104, 106, 223, 141, 219, 220, 461, 64, 99, 101, 97, 376.1, 296, 311, 314, 304; 118/239, 410, 411, 412

[56] References Cited

U.S. PATENT DOCUMENTS

| | | | |
|---|---|---|---|
| 3,193,903 | 7/1965 | White | 425/134 |
| 3,413,143 | 11/1968 | Cameron et al. | 118/410 |
| 3,776,075 | 12/1973 | Matthews | 83/110 |
| 3,884,611 | 5/1975 | Anderson et al. | 425/461 |
| 3,958,532 | 5/1976 | Timson | 118/412 |
| 4,143,187 | 3/1979 | Pilgrim et al. | 118/411 |
| 4,145,173 | 3/1979 | Pelzer et al. | 425/141 |
| 4,272,230 | 6/1981 | Abate | 425/219 |
| 4,501,541 | 2/1985 | Bethell et al. | 425/117 |
| 4,520,049 | 5/1985 | Nakanishi | 118/410 |
| 4,526,528 | 7/1985 | Kline et al. | 425/133.5 |
| 4,537,801 | 8/1985 | Takeda | 118/411 |
| 4,584,155 | 4/1986 | Zanella | 425/117 |
| 4,695,418 | 9/1987 | Baker et al. | 264/151 |
| 4,758,148 | 7/1988 | Jidell | 425/220 |
| 4,789,319 | 12/1988 | Gareia | 425/220 |

*Primary Examiner*—Jay H. Woo
*Assistant Examiner*—Khanh P. Nguyen
*Attorney, Agent, or Firm*—Pollock, Vande Sande & Priddy

[57] ABSTRACT

An apparatus for manufacturing concrete roof tiles by extrusion includes a coating system adapted to be supplied with green concrete and to apply a continuous layer of green concrete onto a continuous strand of movable, positively advanced bottom molds (14), a compacting roll (25) and a smoothing member (35) immediately downstream thereof in the manufacturing direction for compacting and possibly shaping the basic green concrete layer passing therebeneath on the bottom molds. There is provided downstream—as viewed in the manufacturing direction—of the smoothing member (35) for the basic layer (17) and separated therefrom by a gap (40) extending transversely to the manufacturing direction, at least a further smoothing member (45) for another layer, especially a cover layer (18), to be applied onto the basic layer (17). The material for said other layer is supplied under pressure through the gap (40).

6 Claims, 3 Drawing Sheets

APPARATUS FOR MANUFACTURING MULTI-LAYERED CONCRETE ROOF TILES

The present invention is directed to an apparatus for manufacturing multi-layered concrete roof tiles by extrusion. Furthermore the present invention is directed to the concrete roof tiles obtained with the novel apparatus; these roof tiles include, for example, a coat exhibiting improved weather resistance, color fastness and/or life applied onto a base member of conventional concrete. The novel apparatus is suited for manufacturing both board-like and profiled or shaped concrete roof tiles.

More in detail, the present invention is directed to an apparatus for manufacturing concrete roof tiles by extrusion, said apparatus comprising a coating system adapted to be supplied with green concrete and to apply a continuous layer of green concrete onto a continuous strand of movable, positively advanced bottom molds, further comprising a compacting roll and a smoothing member immediately downstream thereof in the manufacturing direction for compacting and possibly shaping the basic green concrete layer passing therebeneath on the bottom molds.

Apparatus of the above-specified kind are known, see for example DE-PS 2,252,047 or DE-OS 3,522,846. The thus compacted and possibly shaped or profiled endless green concrete layer is subsequently cut in a cutting station to obtain newly-made roof tiles of equal length. These newly-made roof tiles are then passed through a spray section in which a plastic coat or a coat of a colored cement slurry is applied onto which a granular coloring agent may be sprinkled. Thereafter the newly-made roof tiles are hardened in hardening compartments under controlled temperature and humidity conditions and are then removed from the bottom dies in a separating station. In this typical operation for the manufacture of coated concrete roof tiles by extrusion the coat is applied onto the newly-made roof tiles which have already been removed from the die. Experience has shown, however, that such coats will weather away to a great extent within as short a time as 10 to 20 years, causing an undesirable change in the appearance of the concrete roof tile surface.

The DE-OS 1,815,973 likewise discloses an apparatus for manufacturing by extrusion multi-layered green concrete products, especially pantiles. The finished pantiles are comprised of a basic concrete layer and at least one further concrete layer for forming the fair face. The fair-faced concrete may differ from the basic concrete in respect to its content of color pigments and other additives and the grading and the like. The known apparatus includes a charging hopper which is divided by partitions into serially arranged compartments for the various grades of concrete. Each compartment has a rough roll and a shaping roll cooperating therewith. Downstream of the last shaping roll—as viewed in the manufacturing direction—a compacting die is provided for jointly compacting all of the individual layers. In this case a rough roll and a shaping roll are provided for each concrete layer. The apparatus expenditure is high, and the production of uniform individual layers leaves much to be desired.

In view of the above facts it is the object of the present invention to provide an apparatus for the manufacture of multi-layered concrete roof tiles, said apparatus being of simple structure and easily integrated in existing systems; also, excellent adhesion between the individual layers and precise dimensioning of the layer thickness for each individual layer are provided thereby.

Proceeding from an apparatus of the kind specified above, the inventive solution of the above-mentioned object is characterized in that downstream of the smoothing member, as seen in manufacturing direction, and separated therefrom by a gap extending transversely to the manufacturing direction there is provided at least a further smoothing member for another layer, especially a finish coat, which is to be applied onto the basic layer, the pressing surface of said smoothing member being upwardly offset relative to the pressing surface of the smoothing member for the basic layer by the layer thickness of said other layer; and that the material for the other layer is supplied under pressure through said gap.

With every additional smoothing member the apparatus according to the present invention permits compacting and shaping of a further layer independently of the basic layer. By suitable arrangement of the smoothing members it is possible to variously adjust the layer thickness of each individual layer. Also, the additional smoothing members can readily be integrated in existing production plants for the manufacture of concrete roof tiles by extrusion such as those known, e.g. from DE-PS 2,252,047 or DE-OS 3,522,846. With such a modified plant it will then also be possible to manufacture concrete roof tiles which have a basic layer of simple, uncolored concrete of sufficient strength and a finish layer of colored high-grade concrete so that weather resistance throughout the prolonged period of time now normally desirable is ensured.

Advantageous embodiments and improvements of the invention will be apparent from the subclaims.

Preferably, the smoothing members for the basic layer and for the finish layer are retained by a bridge spanning the feed path of the bottom molds, and the bridge is provided with at least one channel having its outlet opening into the gap between the smoothing members and its inlet in communication with a pump for delivering the material for the finish layer. Due to the joint attachment of the smoothing members on a bridge which spans the bottom molds, and the channel formed therein for feeding the material of the finish layer, the smoothing members are securely retained and the material is fed with favorable flow characteristics.

A highly suitable pump is a spiral pump which ensures positive feeding of pasty masses such as green concrete under high mechanical pressure and which also permits precise metering of the supplied finish layer material.

Advantageously, the smoothing members can be attached and aligned independently of each other by way of fastening and setting elements, so that the spacing and the inclination of each smoothing member relative to the top of the bottom molds respectively required for the layer thickness can be precisely adjusted in a simple manner.

When the lateral edge regions of the gap between the smoothing members are sealed with a flexible profiled joint of plastics material, especially one made from polyurethane, it is possible to ensure articulated sealing between the smoothing members even if their inclinations are not adjusted to be parallel. A further aspect of the invention is directed to the multi-layered concrete roof tiles obtained with the apparatus according to the invention, the basic layer of these tiles having been smoothed by a smoothing member and the further layer(s), especially the finish layer, having been smoothed and possibly shaped by an additional smoothing member. The base layer may consist of a natural-colored mean-grade concrete of sufficient strength; and the finish layer may consist of a higher-grade concrete containing color pigments. Furthermore, the concrete for the finish layer may contain especially fine-grained aggregates and selected dispersing agents. By controlled selection of the finish layer composition and matching compacting of the finish layer material it is possible to produce finish layers having special properties, in especial high density prolonged life and excellent color fastness. It is possible to cut down costs because the content of expensive additives such as color pigments, dispersing agents and especially fine-grained aggregates is confined to the finish layer which has a substantially smaller volume than the basic layer. In practical use, the thickness of the basic layer may be 7 to 11 mm, especially 9 mm, while the thickness of the finish layer may be 1 to 3 mm, especially 2 mm.

Below, a preferred embodiment of the invention will be described in detail with reference to the accompanying drawing, in which.

Figure 1:
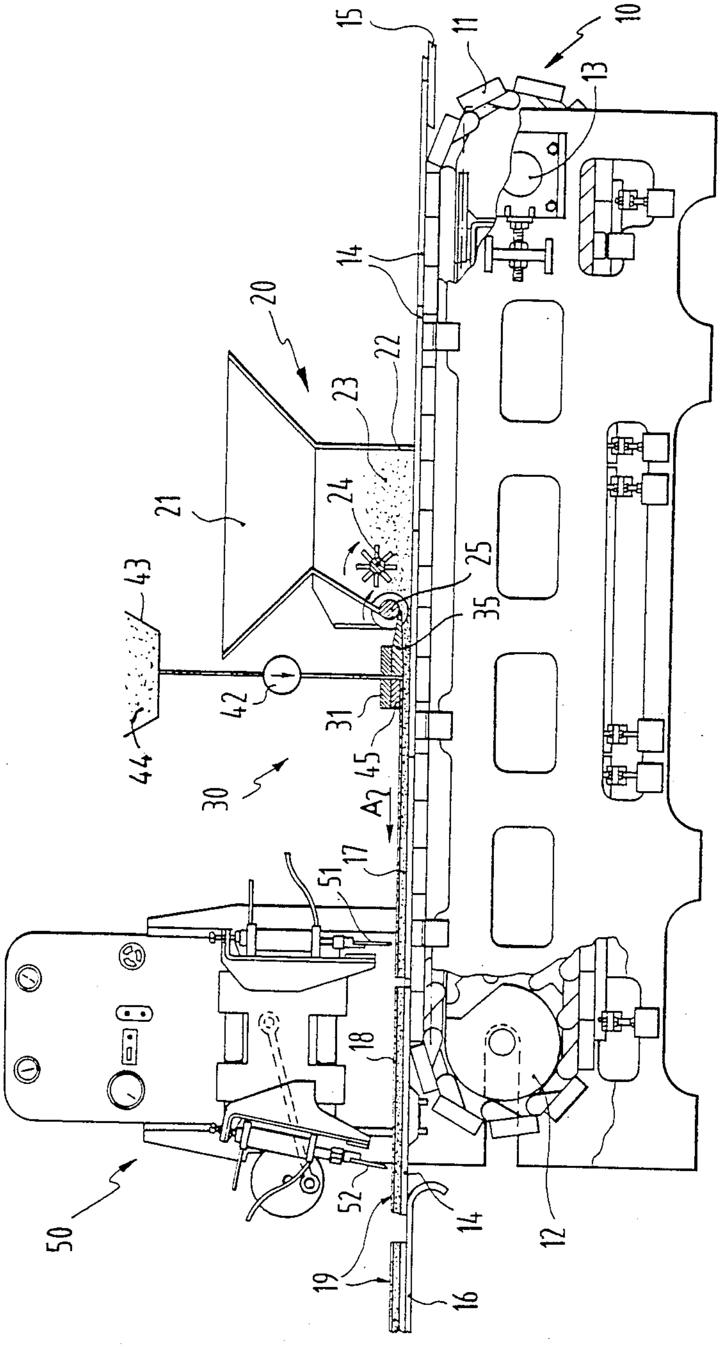
FIG. 1 is a side view of the apparatus according to the invention for manufacturing multi-layered concrete roof tiles by extrusion, the arrangement of the smoothing members being shown in section.

FIG. 1 is part of an overall plant for manufacturing multi-layered or coated concrete roof tiles by extrusion, illustrating especially the coating section 20, the smoothing assembly 30, and a cutting and trimming station 50. A conveyor 10 includes an endless driving chain 11 trained about a drive sprocket 12 and a tail sprocket 13. Above the driving chain 11 a continuous strand of serially arranged bottom molds 14 is disposed on guide means, said molds being advanced by dogs (not illustrated) attached to the driving chain through the coating section 20, past the smoothing assembly 30, and further through the cutting and trimming station 50. A feeder conveyor 15 delivers empty bottom molds, and a discharge conveyor 16 further transports the newly-made roof tiles 19 resting on the bottom molds 14.

A green concrete tank 21 of the coating section 20 is charged with green concrete 23 from a mixer (not illustrated). The bottom molds 14 are moved beneath the mouth 22 of the green concrete tank 21, and a rough roll 24 applies a uniform basic layer 17 of green concrete onto the bottom molds 14. A compacting roll 25, which is adapted to the shape or profile of the concrete roof tiles to be made compacts and shapes the applied basic layer 17 of green concrete.

Figure 2:
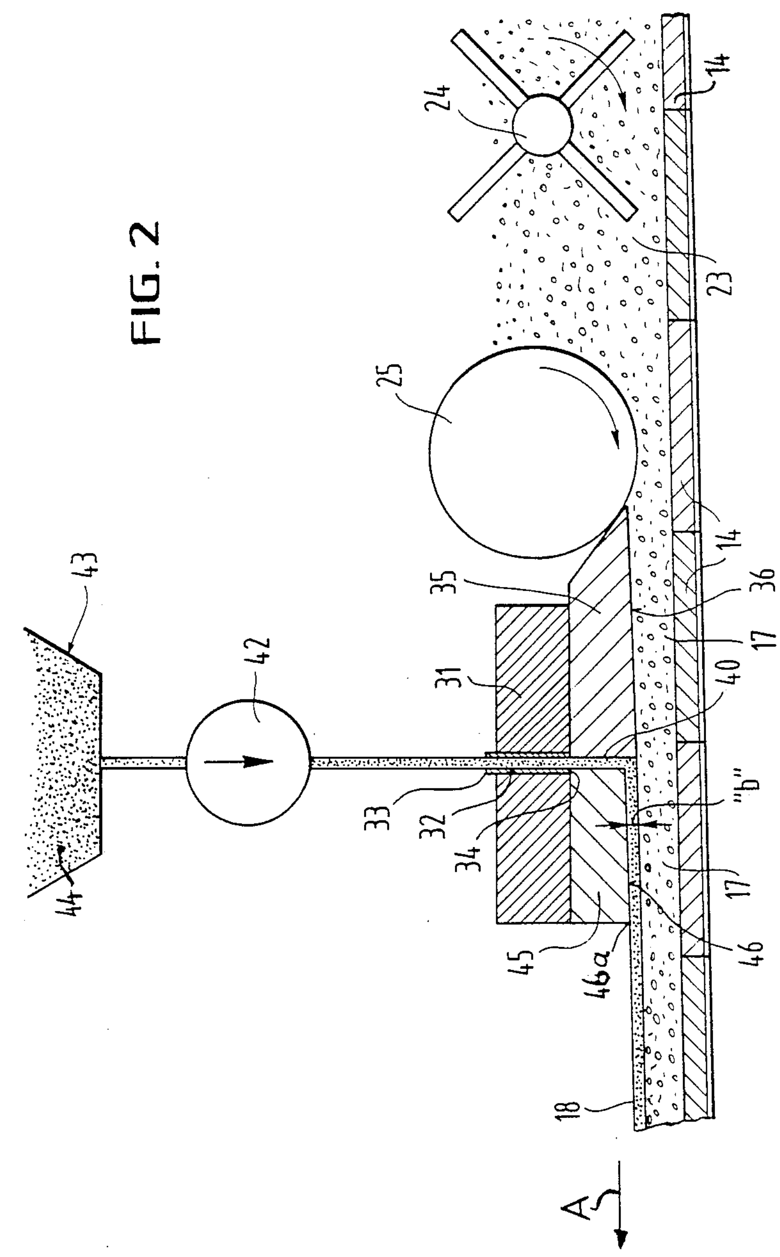
FIG. 2 is an enlarged view showing the arrangement of the smoothing members of the apparatus illustrated in FIG. 1.

Thereupon the bottom molds 14, which are covered by the endless basic layer 17 of green concrete, are advanced beneath the smoothing assembly 30. The smoothing assembly 30 comprises, as will be especially apparent from FIGS. 2 and 3, a bridge 31 spanning the strand of bottom mold and having a smoothing member 35 for the basic layer 17 and a smoothing member 45 for the cover layer 18 provided thereon. The smoothing member 35 for the basic layer is inclined at a predetermined setting angle relative to the plane of advance of the bottom molds 14 and its end face, which forms a pointed edge presented to the compacting roll 25, is directly contiguous tangentially with the lower surface of said compacting roll. With its pressing surface 36 the smoothing member 35 compresses, smoothes and shapes the base layer 17 of green concrete provided on the bottom molds 14 advancing past the smoothing member.

By means of a narrow gap 40, which extends transversely to the manufacturing direction as indicated by the arrow A, the smoothing member 45 for the cover layer is separated from the smoothing member 35 for the basic layer. The smoothing member 45 for the cover layer is likewise inclined at a predetermined setting angle relative to the plane of advance of the bottom molds 14. The pressing surface 46 of the smoothing member 45 is at a level which is higher by the thickness b of the cover layer 18 than the pressing surface 36 of the smoothing member 35. As indicated schematically, the material 44 for the cover layer 18, which is likewise a concrete-like composition, is delivered from a reservoir 43 by means of a pump 42, which preferably is a spiral pump, and is fed through a channel 32 formed in the bridge 31 into the gap 40. From the shaping gap, which is defined between the trailing edge 46*a*—as viewed in manufacturing direction—of the smoothing member 45 for the cover layer and the upper surface of the bottom molds 14, there exits a laminate composed of completely compacted and shaped green concrete, said laminate being composed of the basic layer 17 and the cover layer 18.

The laminate, which still exists in the form of an endless strand, is then further advanced on the bottom molds 14 to a cutting and trimming station 50 (see FIG. 1), where the cutting blade 51 cuts the endless strand into separate newly-made roof tiles 19. Therafter the foot-side edge of the newly-made roof tiles can be trimmed by a trimming tool 52 as described in detail in DE-PS 2,252,047 or DE-OS 3,522,846. Subsequently, the newly-made roof tiles 19 are conveyed to hardening compartments (not illustrated) where they are hardened under controlled temperature and humidity conditions. Then, the concrete roof tiles are removed from the bottom molds 14 in a separating station to be subsequently shipped, while the bottom molds are recycled to the production process.

Figure 3:
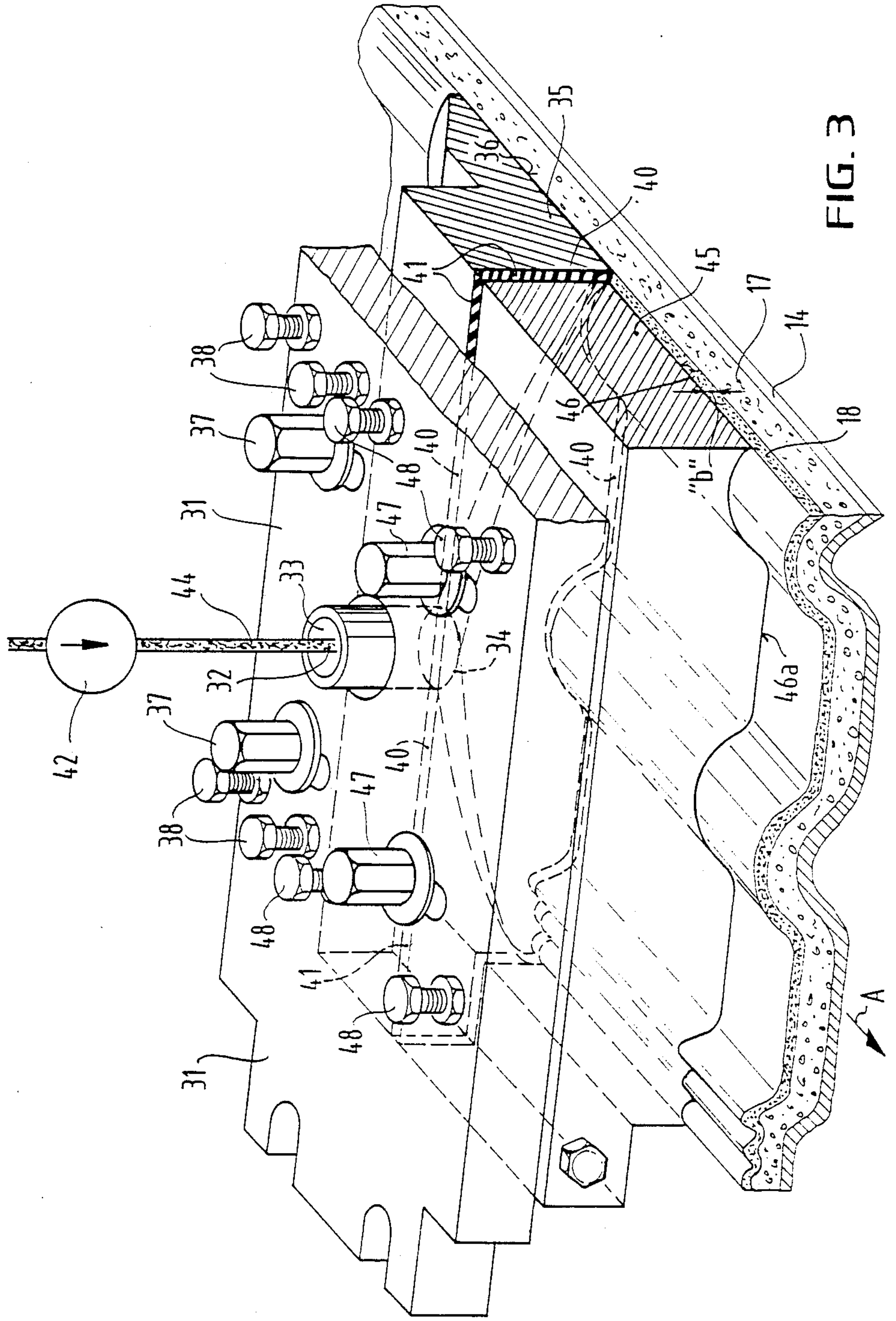
FIG. 3 is a perspective view showing the arrangement of the smoothing members of FIG. 2.

Further details of the arrangement of the smoothing members 35 and 45 will be apparent from FIG. 3. The smoothing members are mounted on the bridge 31 which spans the machine bed and the path of advance of the bottom molds 14. The smoothing member 35 for the basic layer 17 is attached to the bridge 31 via fastening elements 37 in the form of two bolts. By way of setting elements 38 in the form of four bolts, the spacing from and the inclination of the smoothing member 35 relative to the top surface of the bottom molds 14 may be adjusted. Corresponding fastening elements 47 and setting elements 48 are provided for fastening and adjusting the smoothing member 45 for the cover layer 18. The smoothing members are disposed such that between the smoothing member 35 and the smoothing member 45 there remains a narrow gap 40 extending transversely to the manufacturing direction, and that the smoothing member 45 can be aligned independently of the smoothing member 35. The pressing surfaces 36 and 46 of the smoothing members may be made from a hard-metal coat which is joined through an intermediate layer made from a metal/plastic composition to a steel base, as described in detail in EP-PS 0,035,010. The base may also be secured to the bridge 31 through an additional pressure plate. The lateral edge regions of the gap 40 are sealed by means of an elastic plastics joint 41, especially one made from polyurethane, so as to prevent the undesirable escape of material 44 for the cover layer 18. This material is fed under the pressure of the pump 42 through the channel 32 the outlet 34 of which opens into the gap 40 and the inlet 33 of which is connected to the pump 42. Under the high mechanical pressure of the pump 42 the material for the cover layer is uniformly distributed in the gap 40 so that with the aid of the smoothing member 45 a uniform cover layer 18 is produced on the basic layer 17 of green concrete. In the embodiment illustrated, the length of the gap 40 extends across the whole width of the bottom molds 14 so that the top of the roof tiles is coated all over, said coat also including the interlocking seam.

As will be further apparent from FIG. 3, the bottom molds 14 and the smoothing members 35, 45 are shaped so that shaped or profiled concrete roof tiles are manufactured.

We claim:

1. Apparatus for extruding multi-layered roof tiles comprising:

a continuous loop of a plurality of bottom molds for said roof tiles;

first green concrete supply means for feeding green concrete into said bottom molds and forming a first layer of green concrete therein;

a green concrete compacting roll and a first green concrete smoothing member positioned immediately downstream from said first green concrete supply means for compacting and shaping said first layer of green concrete passing thereunder on said bottom molds;

a second green concrete smoothing member positioned downstream from said first concrete smoothing member and separated therefrom by a gap for introducing a second layer of green concrete onto said first layer;

second green concrete supply means for supplying a second green concrete material;

green concrete feeding means for feeding said second green concrete from said second green concrete supply means through said gap and onto said first layer of green concrete to form a second layer of green concrete, said feeding means including a pump for feeding green concrete through said gap under high mechanical pressure; and, means for moving said plurality of bottom molds lengthwise in said apparatus wherein said first and second smoothing members are retained in place by a bridge member which spans the width of the bottom molds and includes at least one channel formed therein and having an inlet in communication with said pump and an outlet opening into the gap between said smoothing members.

2. Apparatus according to claim 1 wherein said pump is a spiral pump.

3. Apparatus according to claim 1 wherein said smoothing members are provided with fastening elements and setting elements for separately fastening and aligning said smoothing members to said bridge.

4. Apparatus according to claim 2 wherein said smoothing members are provided with fastening elements and setting elements for separately fastening and aligning said smoothing members to said bridge.

5. Apparatus according to claim 1 wherein said gap includes lateral edge regions, and said regions are sealed with a flexible plastic.

6. Apparatus according to claim 5 wherein said flexible plastic is polyurethane.

* * * * *